US 6,764,428 B2

(12) United States Patent
Rudolph et al.

(10) Patent No.: US 6,764,428 B2
(45) Date of Patent: Jul. 20, 2004

(54) LOCKING ARRANGEMENT FOR PREVENTING A KEY FROM BEING PULLED OUT OF AN IGNITION STARTING SWITCH OF A MOTOR VEHICLE

(75) Inventors: Gerd Rudolph, Aspisheim (DE); Thomas Hulbert, Eich (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/276,936

(22) PCT Filed: May 18, 2001

(86) PCT No.: PCT/DE01/01942

§ 371 (c)(1),
(2), (4) Date: Nov. 20, 2002

(87) PCT Pub. No.: WO01/89888

PCT Pub. Date: Nov. 29, 2001

(65) Prior Publication Data

US 2003/0115917 A1 Jun. 26, 2003

(30) Foreign Application Priority Data

May 24, 2000 (DE) .......................................... 100 25 651

(51) Int. Cl.[7] .............................................. B60K 25/06
(52) U.S. Cl. .............................. 477/99; 70/247; 70/252
(58) Field of Search .............................. 477/99; 70/247, 70/252

(56) References Cited

U.S. PATENT DOCUMENTS 5,197,312 A * 3/1993 Akutsu ........................ 70/252
5,636,730 A * 6/1997 Merten et al. ............... 200/293
5,860,303 A * 1/1999 Droz et al. .................... 477/99
5,944,534 A * 8/1999 Hoffmann et al. ............ 439/15
6,220,778 B1 * 4/2001 Suchanek et al. ........... 403/327
6,439,014 B1 * 8/2002 Syamoto ...................... 477/99
6,492,744 B1   12/2002 Rudolph et al.

FOREIGN PATENT DOCUMENTS

| DE | 4332478 | 10/1994 |
| EP | 646939 | 4/1995 |
| EP | 706919 | 4/1996 |
| WO | WO98/42540 | 10/1998 |

* cited by examiner

Primary Examiner—Rodney H. Bonck
Assistant Examiner—Dennis Abdelnour
(74) Attorney, Agent, or Firm—David P. Wood

(57) ABSTRACT

The invention relates to an anti-withdrawal device for preventing a key from being withdrawn from an ignition starter switch of an automobile, comprising a blocking device which is coupled with a switch contact of a transmission. The spring-loaded blocking pin of said blocking device can be actuated electromagnetically. The blocking device acts on a detent pawl which is fixed on a rotor of the ignition starter switch and which prevents the ignition starter switch from twisting into a position in which the key can be withdrawn; depending on the position of the transmission. Said blocking device and said ignition starter switch are introduced into a steering-column switch housing that is integral with the casing tube, whereupon the blocking device locks mechanically and is electrically coupled with connection contacts of the ignition starter switch through terminal contacts, said ignition starter switch being connected by a printed circuit board in the steering-column switch housing to an electrical supply system.

19 Claims, 4 Drawing Sheets

LOCKING ARRANGEMENT FOR PREVENTING A KEY FROM BEING PULLED OUT OF AN IGNITION STARTING SWITCH OF A MOTOR VEHICLE

TECHNICAL FIELD

The invention generally relates to locks, and more particularly relates to a locking arrangement for preventing a key from being pulled out of an ignition starting switch of a motor vehicle.

BACKGROUND OF THE INVENTION

DE 43 32 478 C2 discloses a locking arrangement for preventing a key from being pulled out of an ignition starting switch of a motor vehicle with automatic or manual transmission. The locking arrangement operates depending on the transmission being shifted in the "park" or "locked" gear position in which the driving wheels of the motor vehicle are blocked. In this case, an electromagnetic or electromechanic locking mechanism that is connected to a switching contact of the transmission cooperates with a locking shoulder that is arranged on the rotor of the ignition starting switch and prevents the ignition starting switch from being turned into a position in which the key can be pulled out depending on the gear position of the transmission. The locking mechanism on the ignition starting switch consists of an electromagnet with a spring-loaded plunger that blocks the moving path of the rotor containing the locking shoulder with a projection arranged on its free end in the "key locked" position. In this locking arrangement, the housing of the ignition starting switch which accommodates the locking mechanism needs to be designed relatively large in order to accommodate the corresponding components. In addition, the housing is fixed on the steering column jacket of the motor vehicle. The locking mechanism and the ignition starting switch are also electrically separated from one another. This results in a significant installation expenditure because separate supply lines need to be installed and connected for the locking mechanism, as well as for the ignition starting switch.

EP 0 646 939 A1 also discloses an ignition starting switch for a motor vehicle which contains a receptacle for an auxiliary device that cooperates with the ignition starting switch, e.g., a locking arrangement for preventing pulling of the key out of the ignition starting switch. The housing of the ignition starting switch contains a laterally protruding housing projection that is provided with a receptacle opening, into which an insert with the auxiliary device can be inserted. The insert completely covers the receptacle opening and is fixed on the housing projection by means of a separable snap-on connection. Although a mechanical coupling with the auxiliary device is realized in this ignition starting switch, an electric connection with the auxiliary device is not produced so that separate supply lines for the ignition starting switch and the auxiliary device inserted into its housing also need to be provided in this case.

The invention is based on the objective of developing a locking arrangement of the initially described type for preventing pulling of a key out of an ignition starting switch of a motor vehicle, wherein said locking arrangement can be easily installed, has a compact design and can be inexpensively manufactured.

According to the invention, this objective is attained by respectively inserting the locking mechanism and the ignition starting switch into separate openings in the housing of a steering column switch that is rigidly arranged on the steering column jacket, wherein the locking mechanism is mechanically interlocked with the housing of the steering column switch after being inserted therein and electrically connected to contacts of the ignition starting switch via terminal contacts, and wherein the ignition starting switch is connected to an on-board network via a printed circuit board arranged in the housing of the steering column switch.

These measures result in a locking arrangement that has a very compact design because the locking mechanism and the ignition starting switch are directly inserted into separate openings of the steering column switch housing. The simple installation is achieved due to the fact that the locking mechanism is interlocked with the steering column switch housing after being inserted therein, with the electric connection between the ignition starting switch and the locking mechanism simultaneously being produced. This eliminates the need for additional connecting lines that connect the locking mechanism to the on-board network. The printed circuit board that is connected to the ignition starting switch represents the only connection with the on-board network that also comprises the switching contact of the transmission. In addition, no separate housing needs to be provided for the ignition starting switch held in the steering column switch housing.

The locking mechanism preferably comprises a modular housing that is composed of a lower housing part and an upper housing part and serves for accommodating a coil element with terminal contacts that are realized in the form of tuning fork contacts and arranged on its end face. The tuning fork contacts ensure that a reliable connection with the contacts of the ignition starting switch can be easily produced. Since the components are accommodated in the modular housing of the locking mechanism, they are protected from becoming damaged while there are handled, i.e., while being transported, stored and installed. Due to this design, the locking mechanism can, if so required, also be inserted into the steering column switch housing in the form of a separate module. In this case, the proper function of the ignition starting switch is also ensured if no locking mechanism is inserted.

In order to separably mount the locking mechanism in the steering column switch housing, the lower housing part preferably contains a clip-on arm for being mechanically interlocked with the steering column switch housing. The lower housing part and the clip-on arm are integrally manufactured by means of an injection molding process.

In order to achieve an installation that requires hardly any tools and can be automated relatively easily, the lower housing part and the upper housing part of the modular housing are held together by means of snap-on elements, and the tuning fork contacts protrude from a corresponding opening in the lower housing part.

According to one advantageous additional embodiment of the invention, a spring-loaded locking disk with a catch is rotatably supported in the upper housing part above the tuning fork contacts, wherein the catch protrudes from an opening in the modular housing and cooperates with the detent pawl of the ignition starting switch on one hand and with the locking pin on the other hand in the locked position in which the key cannot be pulled out of the ignition starting switch. The catch that is acted upon by the locking pin cooperates with the detent pawl mounted on the rotor of the ignition starting switch in such a way that the ignition starting switch cannot be turned into a position in which the key can be pulled out. The catch held in the locked position by the locking pin merely prevents the ignition starting switch from being turned into a position in which key can be pulled out. This means that the ignition starting switch can still be turned in the opposite direction, for example, for starting the engine of the motor vehicle.

The modular housing preferably contains a taper in the region of the ignition starting switch, wherein the opening for the catch is arranged in the region of this taper. The taper causes the axis of rotation of the catch to be situated relatively close to the axis of rotation of the detent pawl such that favorable lever ratios and low mechanical stress are ensured. A compact structural shape is simultaneously achieved.

In order to achieve a relatively high stability and functional reliability with a low material expenditure, the catch preferably is realized essentially right-angled, wherein one limb protrudes over the taper of the modular housing in the locked position and acts upon a locking surface of the detent pawl while the locking pin engages behind the other limb.

In order to effectively secure the catch from being turned without requiring additional components, the limb of the catch which acts upon the locking surface of the detent pawl adjoins an assigned housing wall in the locked position.

According to one advantageous embodiment of the invention, the catch can be positively controlled by the detent pawl against the effect of a torsion spring in a neutral position in which the key can be pulled out of the ignition starting switch, namely while the corresponding limb of the catch adjoins the detent pawl. An outer corner point of the catch limb assigned to the detent pawl always adjoins the periphery of the detent pawl due to the spring effect. When the locking position is reached, the torsion spring turns the catch in the corresponding direction, and the limb that adjoins the detent pawl comes in contact with the locking surface.

In order to achieve a stable design, the coil element preferably is realized in an essentially U-shaped fashion, wherein a coil is arranged between the limbs. The coil carries one limb of the tuning fork contacts, and the locking pin extends through both limbs, as well as the coil. The tuning fork contacts are surrounded by the material of the coil element or are extrusion-coated just like the coil during the manufacture of the coil element.

The locking pin preferably comprises a head and an actuating projection for the catch, with a compression spring being arranged between the head and one limb of the coil element, namely on a guide projection of the locking pin. The metallic locking pin consequently represents a spring-loaded rotary part of relatively simple design.

In the neutral position, the head of the locking pin advantageously adjoins a limit stop of the upper housing part under the influence of the compression spring, with the actuating projection releasing the assigned limb of the catch of the locking disk. This means that the neutral position, in which the key can be pulled out of the ignition starting switch and the ignition starting switch can be turned into arbitrary switching positions, is maintained in a purely mechanical fashion by the compression spring. In addition, the locking pin is held between the limit stop and the assigned limb of the coil element in a captive fashion.

The coil preferably attracts the locking pin in the locked position in the axial direction against the effect of the compression spring. In order to attract and thusly axially displace the locking pin in the direction of the catch of the locking disk, it is necessary to supply the coil with power via the ignition starting switch depending on the gear position of the transmission. The coil receives a signal regarding the gear position of the transmission via one of the tuning fork contacts connected to the contacts of the ignition starting switch, wherein the ignition starting switch is connected to the switching contact of the transmission via the printed circuit board.

According to another advantageous embodiment of the invention, the ignition starting switch comprises at least one displaceable contact that is realized in the form of a contact spring and acts upon a contact path for supplying the coil with power when the key is inserted. This alleviates the battery of the motor vehicle during the time at which no key is inserted into the ignition starting switch. In addition, the coil is not heated so its service life is extended.

In order to also disengage the battery during the operation of the motor vehicle, the power supply of the coil preferably is dependent on the rotational position of the key. The coil does not require current while the engine of the motor vehicle is running, but only when the key and consequently the ignition starting switch are turned in order to switch off the engine or into a position in which the key can be pulled out of the ignition starting switch.

The steering column switch housing preferably accommodates other individual switches that are coupled to the printed circuit board. This means that the printed circuit board arranged within the steering column switch housing fulfills a series of functions.

In order to simplify the installation, the steering column switch housing contains guide means for unmistakably inserting the modular housing of the locking mechanism. The guide means protect the tuning fork contacts of the locking mechanism and the contacts of the ignition starting switch from damage when the locking mechanism is inserted into the steering column switch housing.

In order to fix the position of the components relative to one another, a web is preferably arranged between the contacts of the ignition starting switch, wherein said web engages into a corresponding recess between the tuning fork contacts of the locking mechanism. Due to this measure, the tuning fork contacts of the locking mechanism are fixed in their position relative to the contacts of the ignition starting switch.

In order to ensure that the available space of the steering column switch housing is optimally utilized in the region of the ignition starting switch and to provide an additional safety device, preferably a transponder coil for a drive-away lock which is functionally connected to a transmitter of the key is assigned to the ignition starting switch, wherein said transponder coil is inserted into the steering column switch housing and connected to the printed circuit board.

The previously described characteristics, as well as the characteristics described below, cannot only be used in the respectively described combination, but also in other combinations without deviating from the scope of the present invention.

DETAILED DESCRIPTION OF THE PREFERRED EMBODIMENTS

Figure 1:
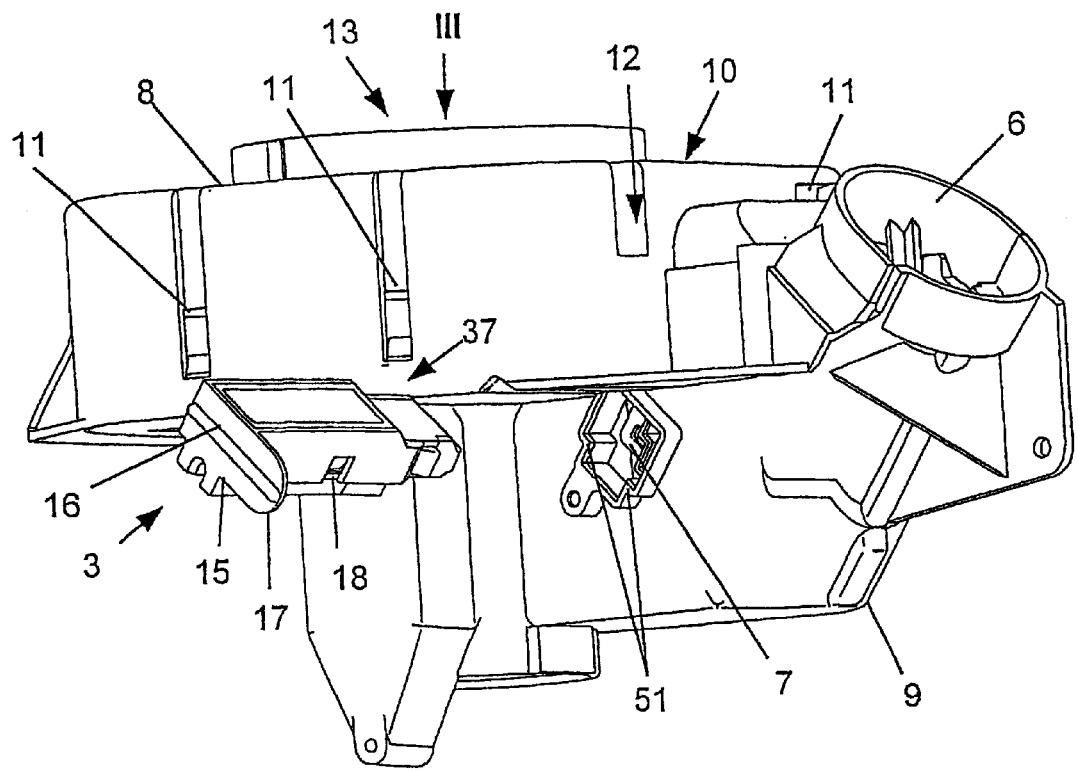
FIG. 1, a perspective representation of a steering column switch housing for a locking arrangement according to the invention.
Figure 2:
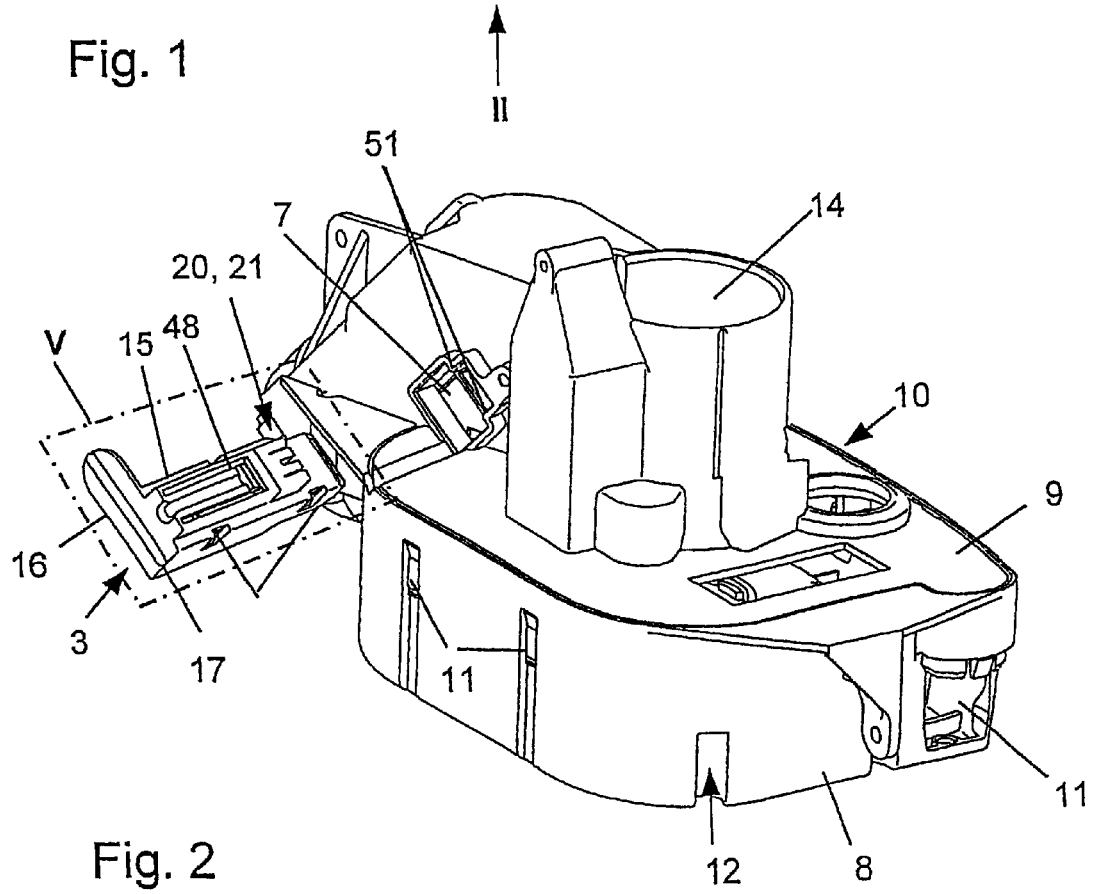
FIG. 2, a perspective representation according to FIG. 1 viewed in the direction of the arrow II.
Figure 3:
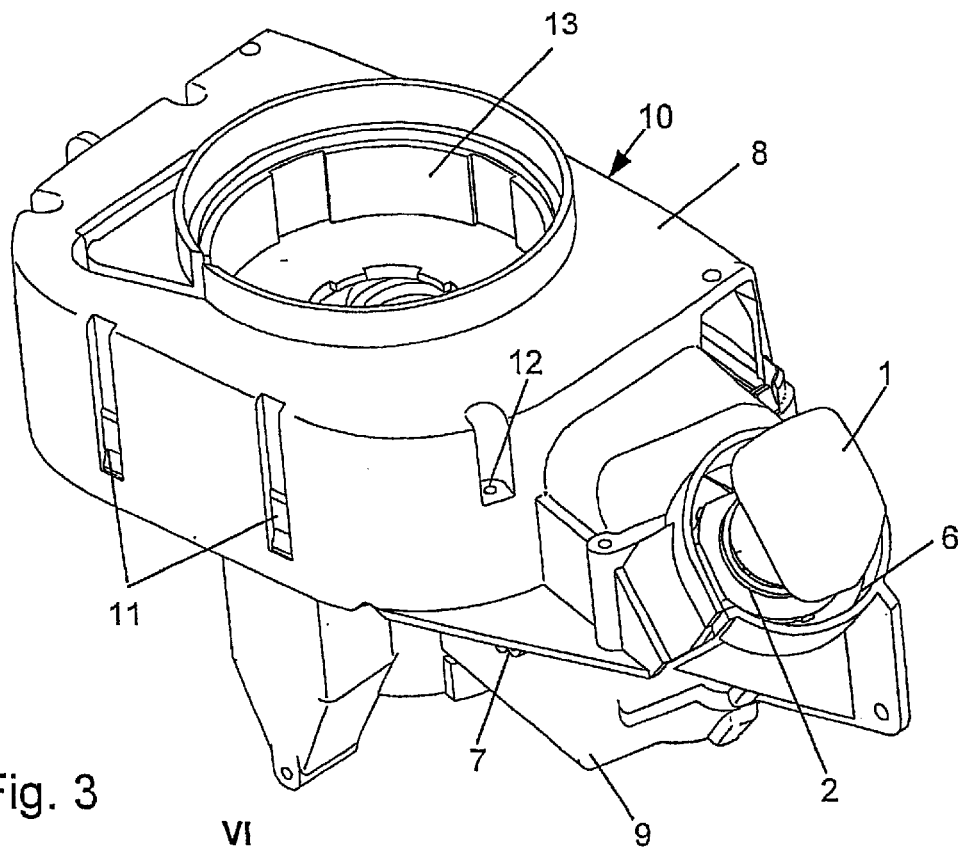
FIG. 3, a perspective representation according to FIG. 1 viewed in the direction of the arrow III.
Figure 4:
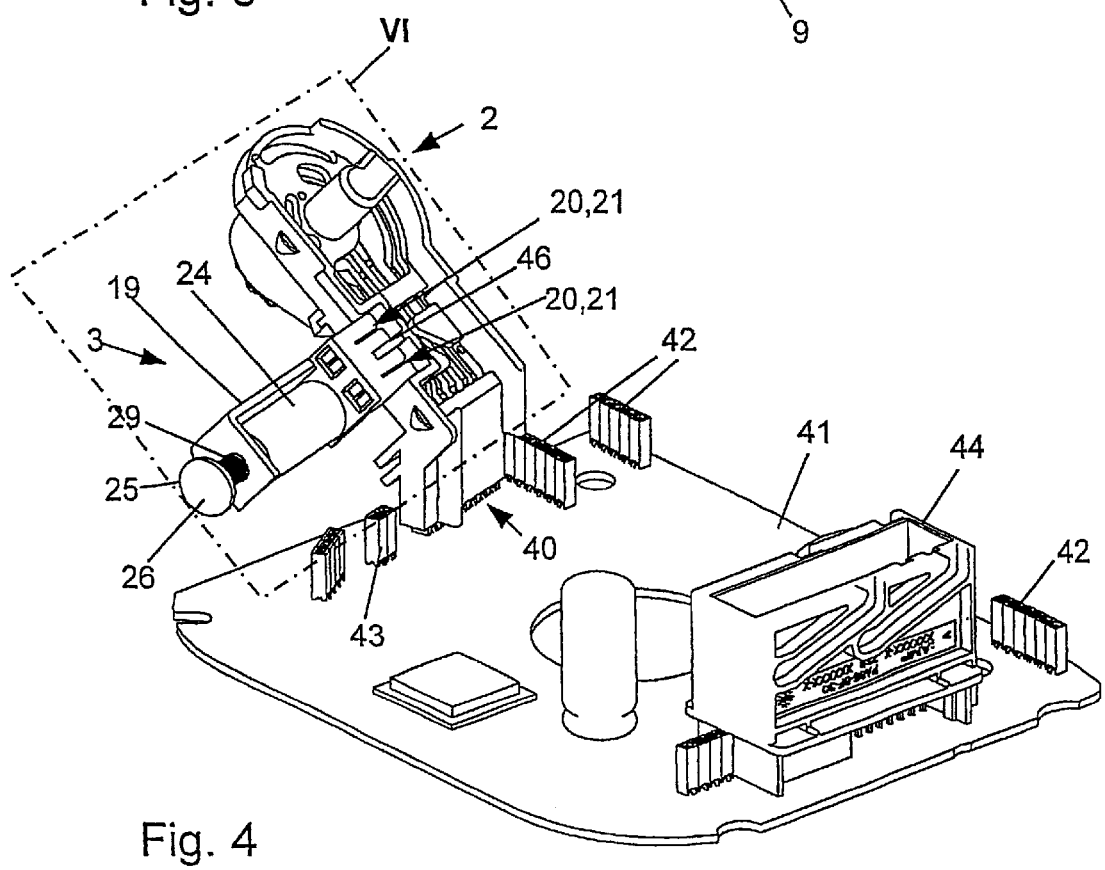
FIG. 4, a perspective representation of a printed circuit board with the locking mechanism.
Figure 5:
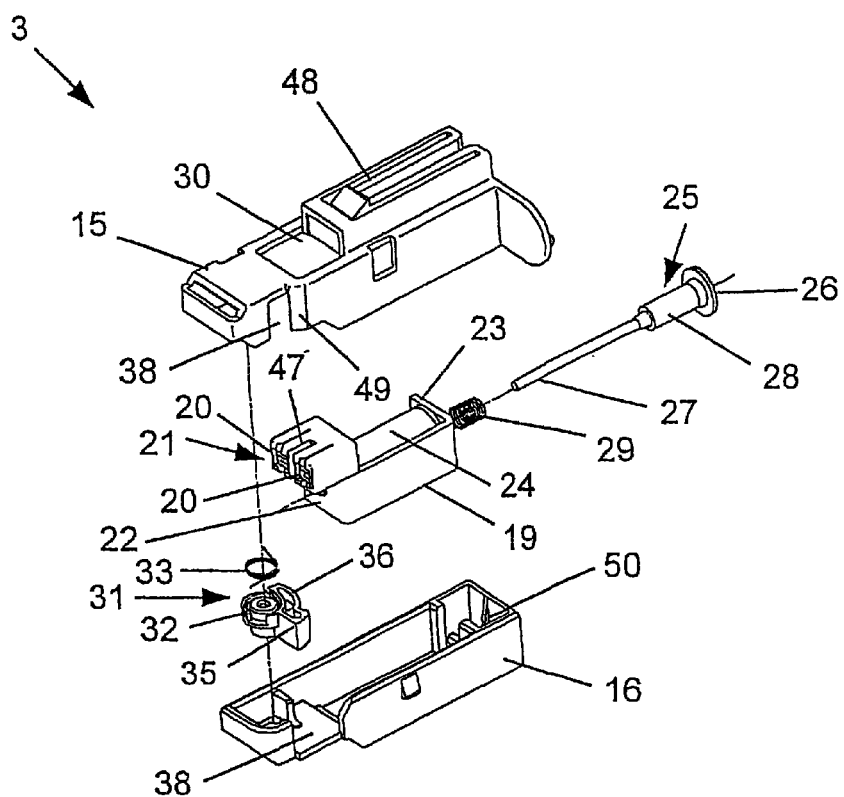
FIG. 5, an exploded view of detail V according to FIG. 2.
Figure 6:
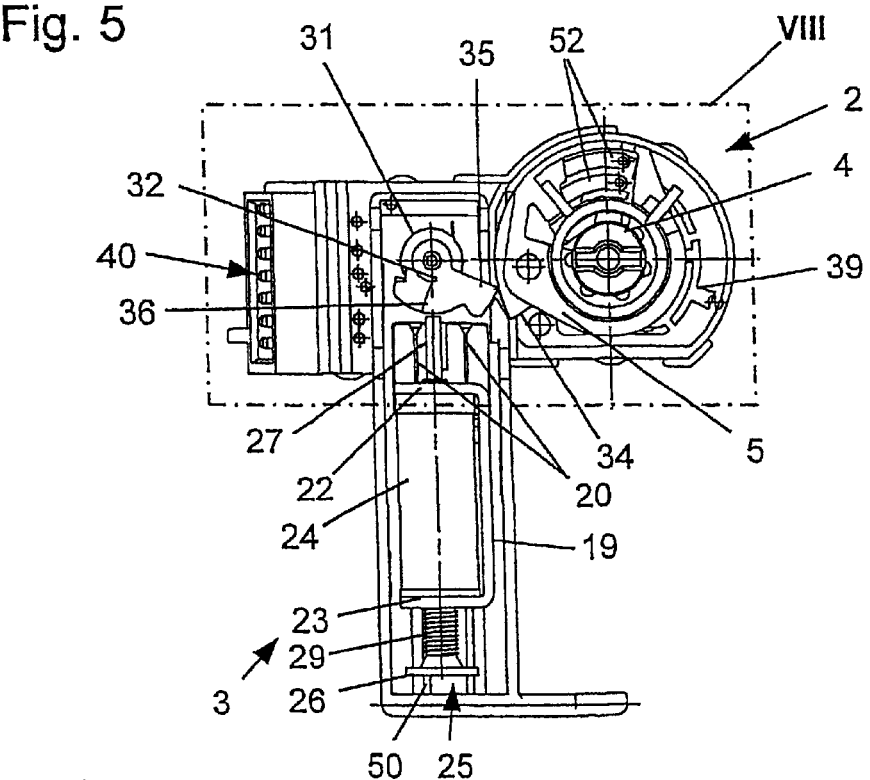
FIG. 6, a top view of detail VI according to FIG. 4.
Figure 7:
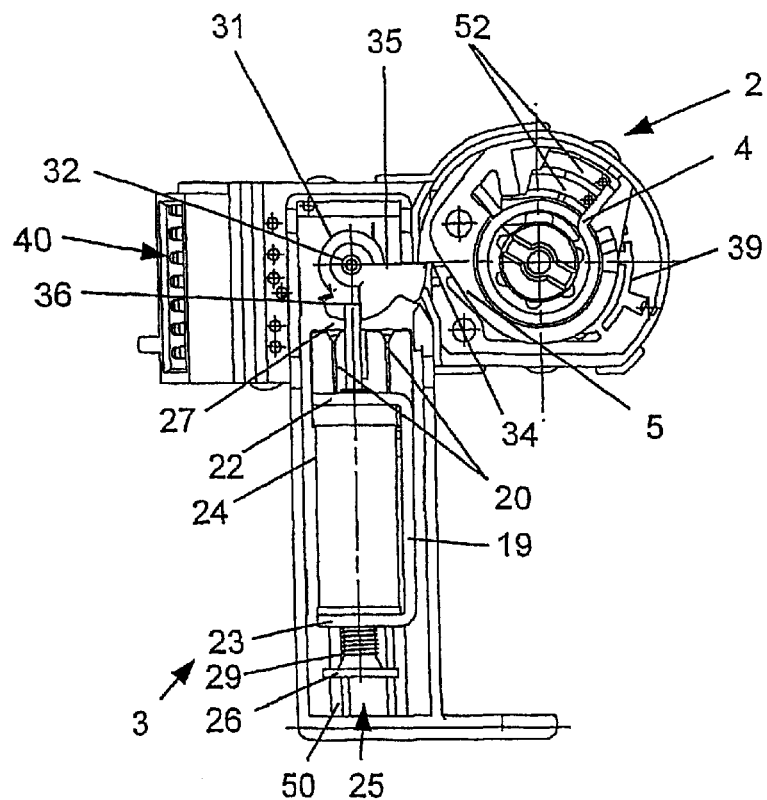
FIG. 7, another top view of detail VI according to FIG. 4.
Figure 8:
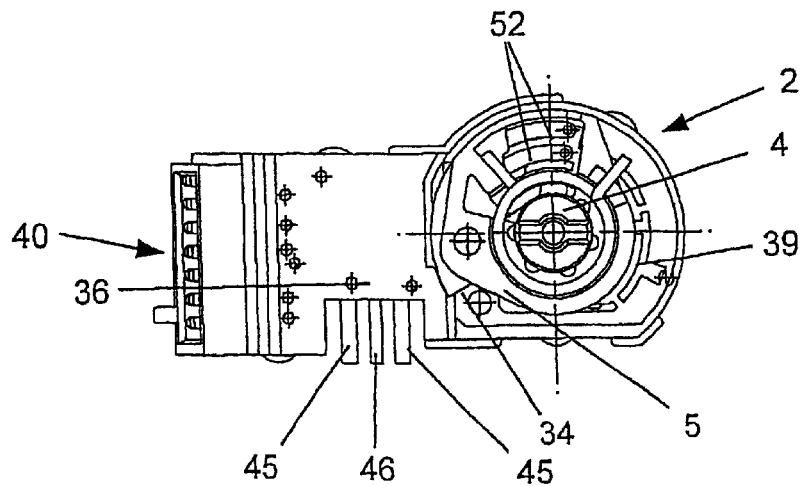
FIG. 8, a partial top view of detail VII according to FIG. 6.

Now referring to FIGS. 1 through 3, the locking arrangement for preventing pulling of a key 1 out of an ignition starting switch 2 of a motor vehicle comprises a locking mechanism 3, as well as a detent pawl 5 that is fixed on a rotor 4 of the ignition starting switch 2. The ignition starting switch 2 and the locking mechanism 3 are respectively inserted into separate openings 6, 7 of a steering column switch housing 10 that is composed of an upper part 8 and a lower part 9. The upper part 8 that is connected to the lower part 9 by means of clip-on elements 11, as well as screws inserted into bores 12, contains receptacles 53 for not-shown individual switches in the form of a blinker switch and a windshield wiper/washer switch. In addition, a recess 13 for a not-shown, spirally wound electric connecting device is arranged in the upper part 8. In this case, the connecting device couples an airbag module to an on-board network. The lower part 9 of the steering column switch housing 10 is provided with a correspondingly shaped receptacle 14 such that it can be fixed on a not-shown steering column jacket.

The locking mechanism 3 comprises a modular housing 17 that is composed of an upper housing part 15 and a lower housing part 16. The upper housing part 15 and the lower housing part 16 are held together by means of a snap-on connection 18 and accommodate a coil element 19 with terminal contacts 21 that are realized in the form of tuning fork contacts 20.

The coil element 19 is realized in a U-shaped fashion and holds a coil 24 between its limbs 22, 23. One of the limbs 22 carries the tuning fork contacts 20 that are injection-moulded into the coil element 19 and protrude from an opening 30 in the upper housing part 15. A locking pin 25 that extends through the limbs 22, 23 of the coil element 19 and comprises a head 26 and an actuating projection 27 is inserted into the coil. A guide projection 28 for a compression spring 29 is formed between the head 26 and the actuating projection 27. One end of the compression spring 29 is supported on the assigned limb 23 of the coil element 19, with its other end being supported on the head 26 of the locking pin 25. A locking disk 31 with a catch 32 integrally formed thereon is rotatably supported in the upper housing part 16 above the tuning fork contacts 20 that are essentially arranged on the end face of the modular housing 17. A torsion spring 33 is assigned to the locking disk 31, with the catch 32 essentially being realized right-angled. The catch 32 has two limbs 35, 36 in order to act upon the detent pawl 5 that is assigned to the ignition starting switch 2 and contains a locking surface 34, with one limb 35 being situated in the region of the detent pawl 5 and the other limb 36 being assigned to the actuating projection 27 of the locking pin 25. In order to position the catch 32 of the locking disk 31 as close as possible to the detent pawl 5, the modular housing 17 of the locking mechanism 3 contains a taper 37 in this region, with an opening 38 for the assigned limb 35 being arranged in the modular housing 17 in the region of the taper 37.

The ignition starting switch 2 inserted into the corresponding opening 6 of the steering column switch housing 10 comprises a pressed screen 39 with contacts 40 that contact a printed circuit board 41 inserted into the steering column switch housing 10, as well as contacts 45 that engage into the tuning fork contacts 20 of the locking mechanism 3. A web 46 arranged between the contacts 45 engages into a corresponding recess 47 between the tuning fork contacts 20. The printed circuit board 41 also contains terminals 42 for the individual switches and a plug-type connection 43 for a transponder coil that is arranged in the region of the ignition starting switch 2 and cooperates with a transmitter of the key 1, as well as a drive-away lock. In other respects, a coupling device 44 for realizing connection with an on-board network and a bus system of the motor vehicle is assigned to the printed circuit board 41. The printed circuit board 41 and the ignition starting switch 3 are connected to a switching contact of a transmission via this coupling device 44, with said switching contact delivering information with respect to the gear position of the transmission.

Once the ignition starting switch 2 is inserted, the locking mechanism 3 is installed by inserting the locking mechanism 3 into the corresponding opening 7 in the steering column switch housing 10, wherein a clip-on arm 48 that is integrally formed onto the lower housing part 16 produces a mechanical clip-on connection with the steering column switch housing 10, and with the tuning fork contacts 20 accommodating the contacts 45 of the ignition starting switch 2. This means that the mechanical connection between the locking mechanism 3 and the steering column switch housing 10 and the electric connection between the locking mechanism 3 and the ignition starting switch 2 are simultaneously produced. The opening 7 in the steering column switch housing 10 contains guide means 51 for unmistakably inserting the modular housing 17.

When the catch 32 of the locking mechanism 3 is situated in a locked position in which the key cannot be pulled out of the ignition starting switch 2, the limb 35 of the catch 32 contacts the locking surface 34 of the detent pawl 5 fixed on the rotor 4 of the ignition starting switch 2 under the influence of the torsion spring 33, with said limb being supported on a housing wall 49 of the lower housing part 16. The actuating projection 27 of the locking pin 25 simultaneously engages behind the limb 36 of the catch 32 such that the catch is prevented from being turned into the position in which the key 1 can be pulled out. In order to engage behind the limb 36, the coil 23 of the locking mechanism 3 is supplied with power via the ignition starting switch 2, with the locking pin 25 being axially displaced against the effect of the compression spring 29 and held in this position.

If the transmission is now shifted into the park or idle/neutral gear position, the power supply of the coil 23 is interrupted, the head 26 of the locking pin 25 contacts the limit stop 50 due to the effect of the compression spring 29 and the catch 32 of the locking mechanism 3 is moved into a neutral position in which the key 1 can be pulled out of the ignition starting switch 2. In this neutral position, the limb 35 of the catch 32 adjoins the periphery of the detent pawl 5 under the influence of the torsion spring 33 and is positively controlled by the detent pawl.

In order to disengage the battery of the motor vehicle, the ignition starting switch 2 comprises displaceable contacts 52 that, when the key 1 is inserted, act upon assigned strip contacts of the pressed screen 39 for the power supply of the coil 24. Since the coil 24 only needs to be supplied with power within a certain angular range that depends on the rotational position of the key 1, the strip contacts assigned to the displaceable contacts 52 cover this angular range.

Strip contacts are not provided within the range in which the engine of the motor vehicle is running.

| | List of reference symbols |
|---|---|
| 1 | Key |
| 2 | Ignition startng switch |
| 3 | Locking mechanism |
| 4 | Rotor |
| 5 | Detent pawl |
| 6 | Opening |
| 7 | Opening |
| 8 | Upper part |
| 9 | Lower part |
| 10 | Steering column switch housing |
| 11 | Clip-on connection |
| 12 | Bore |
| 13 | Recess |
| 14 | Receptacle |
| 15 | Upper housing part |
| 16 | Lower housing part |
| 17 | Modular housing |
| 18 | Snap-on connection |
| 19 | Coil element |
| 20 | Tuning fork contact |
| 21 | Terminal contact |
| 22 | Limb |
| 23 | Limb |
| 24 | Coil |
| 25 | Locking pin |
| 26 | Head |
| 27 | Actuating projection |
| 28 | Guide projection |
| 29 | Compression spring |
| 30 | Opening |
| 31 | Locking disk |
| 32 | Catch |
| 33 | Torsion spring |
| 34 | Locking surface |
| 35 | Limb |
| 36 | Limb |
| 37 | Taper |
| 38 | Opening |
| 39 | Pressed screen |
| 40 | Contact |
| 41 | Printed circuit board |
| 42 | Terminal |
| 43 | Plug-type connection |
| 44 | Coupling device |
| 45 | Contact |
| 46 | Web |
| 47 | Recess |
| 48 | Clip-on arm |
| 49 | Housing wall |
| 50 | Limit stop |
| 51 | Guide means |
| 52 | Displaceable contact |
| 53 | Receptacle |

What is claimed is:

1. Locking arrangement for preventing a key from being pulled out of an ignition starting switch of a motor vehicle, comprising:

a locking mechanism coupled to a switching contact, wherein a spring-loaded locking pin of said locking mechanism is electromagnetically actuated, and wherein the locking mechanism acts upon a detent pawl that is fixed on a rotor of an ignition starting switch and prevents the ignition starting switch from being turned into a position in which the key can be pulled out, wherein the locking mechanism and the ignition starting switch are inserted into separate openings of a steering column switch housing that is rigidly arranged on a steering column jacket, wherein the locking mechanism is mechanically interlocked with the steering column switch housing and electrically connected to contacts of the ignition starting switch, and wherein the ignition starting switch is connected to an on-board network by way of a printed circuit board arranged in the steering column switch housing.

2. Locking arrangement according to claim 1, wherein the locking mechanism includes a modular housing that is composed of a lower housing part and an upper housing part and accommodates a coil element with terminal contacts that are arranged on its end face and realized in the form of tuning fork contacts.

3. Locking arrangement according to claim 2, wherein the lower housing part is provided with a clip-on arm for mechanically interlocking the lower housing part to the steering column switch housing.

4. Locking arrangement according to claim 2, wherein the lower housing part and the upper housing part of the modular housing are held together by means of snap-on connections, with the tuning fork contacts protruding from a corresponding opening in the lower housing part.

5. Locking arrangement according to claim 2, wherein a spring-loaded locking disk with a catch is rotatably supported in the upper housing part above the tuning fork contacts, wherein the catch protrudes out of an opening of the modular housing and cooperates with a detent pawl of the ignition starting switch on one hand and with the locking pin on the other hand in a locked position in which the key is prevented from being pulled out of the ignition starting switch.

6. Locking arrangement according to claim 5, wherein in a neutral position in which the key can be pulled out of the ignition starting switch, the catch can be positively controlled by the detent pawl against the effect of a torsion spring while the corresponding limb adjoins said detent pawl.

7. Locking arrangement according to claim 5, wherein the locking pin comprises a head and an actuating projection for the catch, and wherein a compression spring is arranged between the head and one limb of the coil element.

8. Locking arrangement according to claim 7, wherein the head of the locking pin adjoins a limit stop of the upper housing part under the influence of the compression spring in the neutral position, with the actuating projection releasing the assigned limb of the catch of the locking disk.

9. Locking arrangement according to claim 8, wherein the coil attracts the locking pin in the axial direction against the effect of the compression spring in the locked position.

10. Locking arrangement according to claim 2, wherein the modular housing contains a taper in a region of the ignition starting switch, with an opening for the catch being arranged in the region of the taper.

11. Locking arrangement according to claim 10, wherein the catch is right-angled, with one limb protruding over the taper of the modular housing and acting upon a locking surface of the detent pawl in the locked position, and with the locking pin engaging behind the other limb.

12. Locking arrangement according to claim 11, wherein the limb of the catch which acts upon the locking surface of the detent pawl adjoins an assigned housing wall in the locked position.

13. Locking arrangement according to claim 2, wherein the coil element is U-shaped, with a coil arranged between the two limbs, wherein one limb carries the tuning fork contacts and the locking pin extends through both limbs as well as the coil.

14. Locking arrangement according to claim 2, wherein a web is arranged between contacts of the ignition starting switch, with said web engaging into a corresponding recess between the tuning fork contacts of the locking mechanism.

15. Locking arrangement according to claim 1, wherein the ignition starting switch includes at least one displaceable contact in the form of a contact spring that acts upon a strip contact for a power supply of a coil when the key is inserted.

16. Locking arrangement according to claim 15, wherein the power supply of the coil depends on the rotational position of the key.

17. Locking arrangement according to claim 1, wherein the steering column switch housing accommodates other individual switches that are coupled to the printed circuit board.

18. Locking arrangement according to claim 1, wherein the steering column switch housing contains guide means for unmistakably inserting the modular housing of the locking mechanism.

19. Locking arrangement according to claim 1, wherein a transponder coil for a drive-away lock which is functionally connected to a transmitter of the key is assigned to the ignition starting switch, wherein said transponder coil is inserted into the steering column switch housing and connected to the printed circuit board.

* * * * *